May 16, 1961  M. E. OAKES  2,984,368
TRUCK LEVELER
Filed June 13, 1958  2 Sheets-Sheet 1

INVENTOR.
MARVIN E. OAKES
BY John R. Walker, III
Attorney

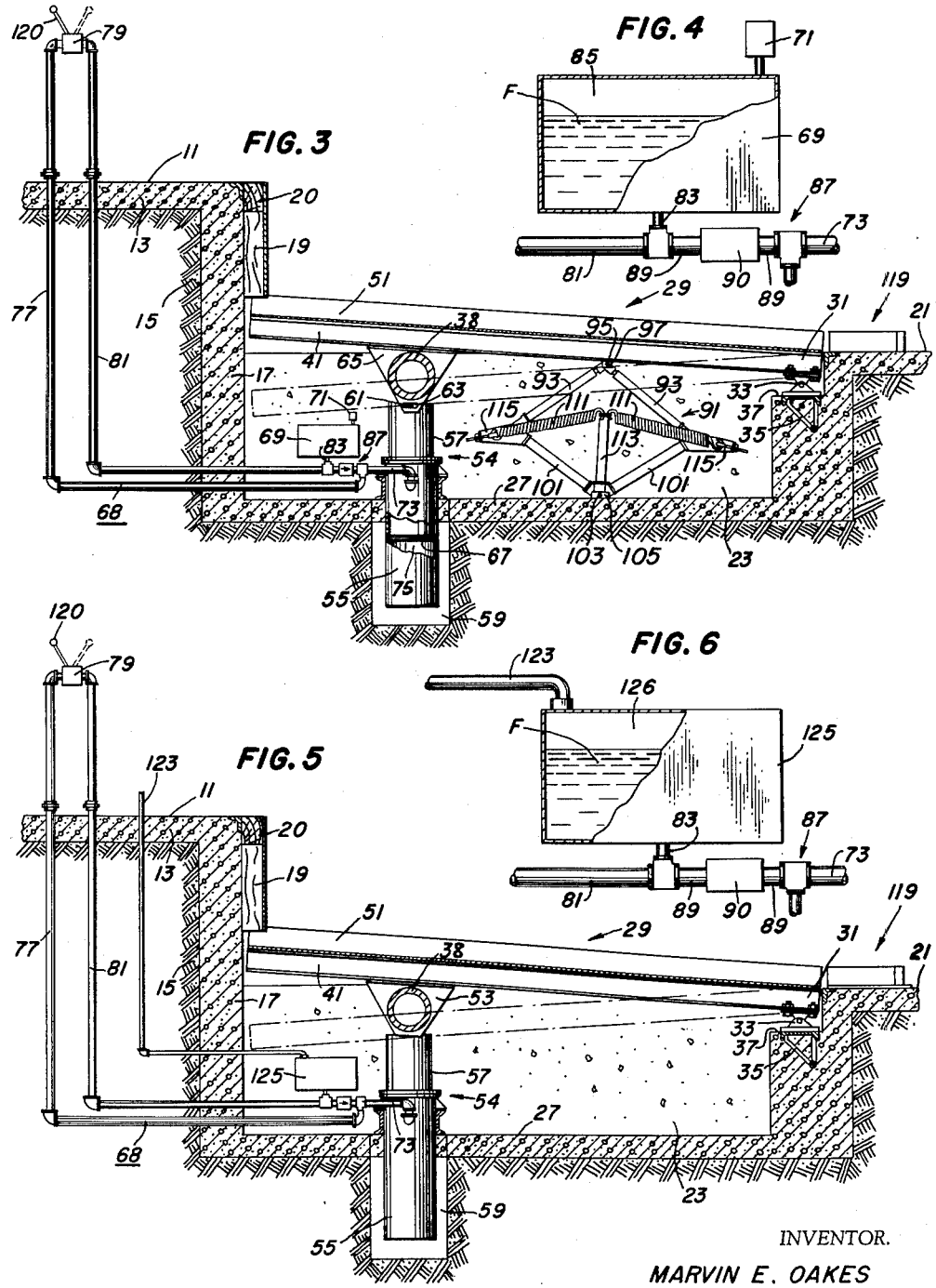

United States Patent Office 2,984,368
Patented May 16, 1961

2,984,368

TRUCK LEVELER

Marvin E. Oakes, Memphis, Tenn., assignor to Dover Corporation, Washington, D.C.

Filed June 13, 1958, Ser. No. 741,963

2 Claims. (Cl. 214—38)

This invention relates to a loading dock and more particularly to a truck leveler for adjusting vertically the rearward section of a truck so that the bed of the truck is level with the loading dock platform, whereby the truck may be loaded and unloaded without the use of auxiliary means such as floor plates or the like spanning the loading dock platform and the bed of the truck. In a typical truck leveler of this type, a ramp is mounted for swinging movement about one end remote from the loading dock platform and the truck backs upon the ramp which is then adjusted vertically to the proper position for the truck bed to be level with the dock platform.

Heretofore, in truck levelers of the above-mentioned type, power means such as hydraulic power jacks have been used to adjust the ramp vertically to effect leveling. The use of power to effect leveling necessitates a power unit with its accompanying piping, wiring, etc., which power unit and equipment are costly not only in installation but in operation.

Therefore, one of the objects of the present invention is to provide a truck leveler in which there are no power requirements and which is semi-automatic in operation.

A further object is to provide such a truck leveler having a ramp which is biased to an upward position for movement towards a lowered position by the weight of a truck backed onto the ramp.

A further object is to provide such a truck leveler including resistance means resisting the downward movement of the ramp and including control means for varying the amount of resistance whereby the ramp is adapted to be lowered at a controlled rate and to a position in which the bed thereof is level with the loading dock platform.

A further object is to provide such a resistance means which includes a cylinder, a plunger slidably mounted therein, and a hydraulic system which is a closed system having no hydraulic power unit therein but which functions to control the flow of hydraulic fluid from the cylinder, thereby controlling the position of the plunger and, thus, the position of the ramp and truck.

A further object is to provide a truck leveler in which the ramp thereof, upon the departure of the truck, is automatically returned to an upward position ready for the reception of another truck.

A further object is to provide a unique truck leveler which is simple in construction and economical to manufacture, to install, and to operate.

A further object is generally to improve the design and construction of truck levelers.

The means by which the foregoing and other objects of the present invention are accomplished and the manner of their accomplishment will be readily understood from the following specification upon reference to the accompanying drawings, in which:

Fig. 3 is a longitudinal sectional view thereof taken as on the line III—III of Fig. 2, showing the ramp in an unloaded or upward position in solid lines and showing the damp in an extreme lowered position in broken lines.

Fig. 4 is a fragmentary view on an enlarged scale of the tank and pipe connections thereto of the embodiment shown in Fig. 3, with a portion of the tank broken away for purposes of illustration.

Fig. 5 is a view similar to Fig. 3, and taken as on the line V—V of Fig. 2, of a modified form of the present invention.

Fig. 6 is a view similar to Fig. 4 of the tank and pipe connections thereto of the embodiment shown in Fig. 5.

Figure 1:
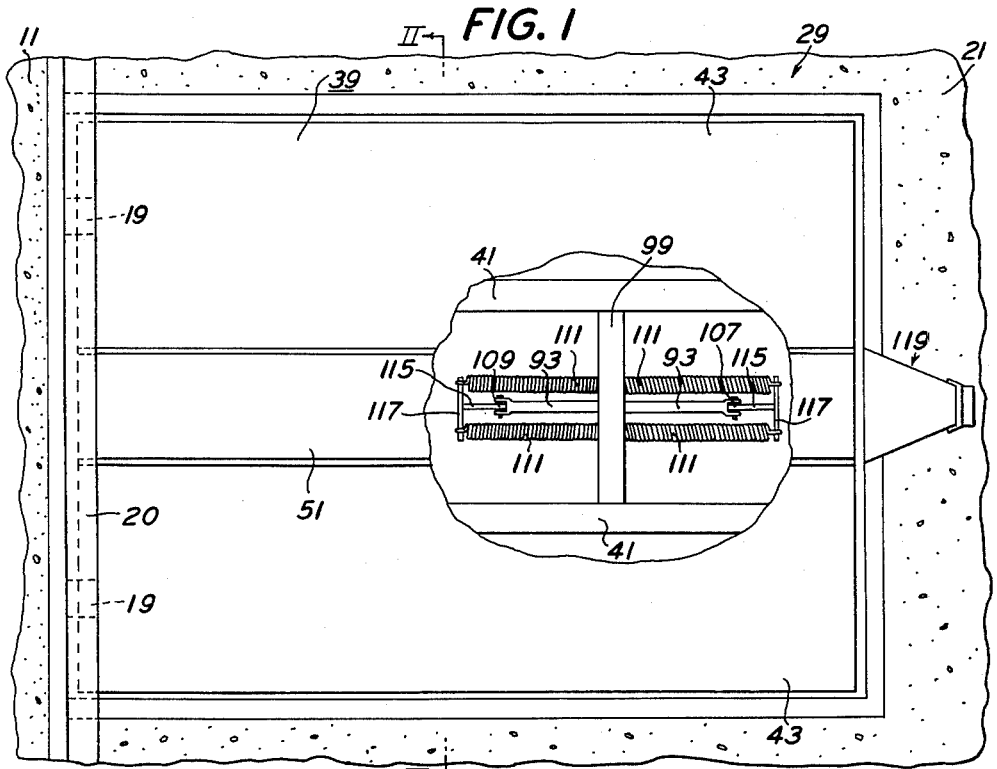
Fig. 1 is a plan view of a truck loading dock embodying the present invention with parts being broken away for purposes of clarity.
Figure 2:
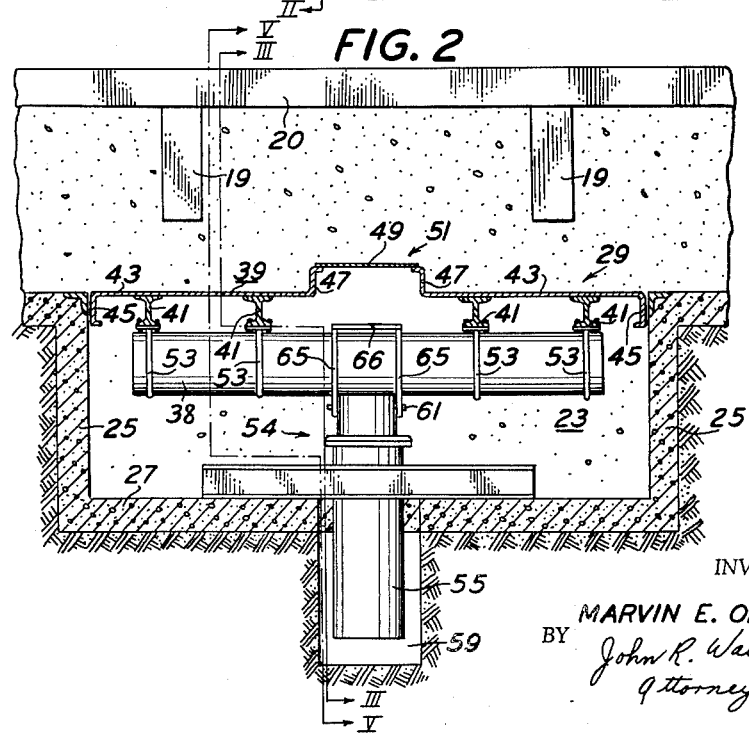
Fig. 2 is a transverse sectional view thereof taken as on the line II—II of Fig. 1.

Referring now to the drawings in which the various parts are indicated by numerals, the loading dock incorporating the present invention comprises a loading platform 11 formed by a concrete slab 13 supported by a dirt fill 15 and a vertical retaining wall 17 depending from the outer edge of the platform. A wooden bumper, which is preferably metal covered, is fixedly attached adjacent the upper edge of retaining wall 17 and includes a pair of spaced portions 19 depending from a horizontal portion 20 of the bumper. The height of loading platform 11 above a roadway 21 disposed in front of the loading dock approximates the average height of the bed of highway trucks.

Adjacent retaining wall 17 and extending outwardly therefrom is provided a pit 23 below the level of roadway 21, which pit is preferably rectangular in shape as viewed from above and preferably lined by concrete retaining walls 25 and by a concrete floor 27.

A ramp 29 substantially covers the top of pit 23 with a clearance being provided between the ramp and the retaining walls of the pit. Ramp 29 is pivotally mounted adjacent the end 31 thereof remote from loading platform 11 as by means of hinges 33 pivotally supporting the ramp from a ledge 37 disposed a short distance below the level of roadway 21. Hinges 33 are secured to ramp 29 by bolts or the like and secured to ledge 37 by anchoring means 35 set in the ledge. Ramp 29, which is adapted to support a truck thereon, is pivotal between an upward position shown in solid lines in Fig. 3 and a lowered position shown in broken lines in this figure. The height of said upward position is preferably such that when a truck is loaded thereon the bed thereof will be higher than loading platform 11. In other words, it should be high enough so that the bed of a truck, with the lowest bed height to be accommodated at the loading dock, will be above loading platform 11. Also, the height of said extreme lowered position is preferably low enough so that the bed of a truck, with the highest bed height to be accommodated at the loading dock, will be level with or below the level of loading platform 11.

Structurally, ramp 29 preferably comprises a torque tube 38 and a platform 39 mounted thereon, which platform is adapted to support the rear wheels on both sides of a truck, not shown, backed up to loading platform 11. Platform 39 is formed by a plurality of parallel spaced beams 41 extending longitudinally of the platform and supporting floor plates 43 disposed longitudinally in spaced relationship on either side of the platform. The outer edges of plates 43 depend downwardly to form skirts 45. The inner edges of floor plates 43 extend upwardly as at 47, thence inwardly towards one another for a short distance and have a cover plate 49 attached thereto which spans the space therebetween to form a curb section designated in general as at 51. Brackets 53 respectively connect beams 41 to torque tube 38. Brackets 53 are attached to beams 41 as by bolts or the like and are centrally apertured to receive torque tube 38 therethrough, which torque tube is attached to the brackets as by welding or the like. The specific construction of ramp 29 herein given is illustrative only and not intended as a limitation since changes therein may be made without departing from the spirit and scope of the present invention.

Installed below ramp 29 is a fluid cylinder and plunger combination 54 which comprises an upright cylinder 55 that is upwardly opening and a plunger 57 slidably mounted in the upper end of the cylinder for movement between an upward or extended position and a lowered or retracted position. Cylinder 55 is closed at the lower end thereof and provided with suitable packing or the like, not shown, adjacent the upper end of the cylinder. Cylinder 55 is installed in a hole 59 extending through and below floor 27 of pit 23. Ramp 29 rests on the top of plunger 57 and is coupled thereto as by pins 61 fixedly mounted on plunger 57 adjacent the upper end thereof and extending laterally outward in opposite directions respectively through slots 63 provided in a pair of inner brackets 65 which are similar in construction to brackets 53 and are disposed on opposite sides of plunger 57. Inner brackets 65 are preferably interconnected by a horizontal member 66 fixedly attached to the inner brackets adjacent the upper ends thereof. Said upward position of plunger 57 corresponds to said upward position of ramp 29, and, similarly, said lowered position of plunger 57 corresponds to said lowered position of ramp 29. In fact, the means for stopping ramp 29 in the extreme upward and lowered positions is preferably by plunger 57. Thus, the lower stop is preferably provided by plunger 57 abutting the lower end of cylinder 55 and the upper stop by suitable means carried by plunger 57 abutting suitable stop means carried by cylinder 55, as, for example, by a collar 67 carried at the lower end of plunger 57 abutting a bearing, not shown, mounted from cylinder 55 which slidably receives plunger 57.

Cylinder 55 forms part of a fluid system which contains a hydraulic fluid or the like and which fluid is designated as at F. The other part of the system includes the following: Conduit means designated in general as at 68 couples cylinder 55 to a fluid tank 69 having a vent 71. Conduit means 68 comprises a pipe section 73 coupled to cylinder 55 and communicating with the chamber 75 of the cylinder, a pipe 77 coupled to pipe section 73 at one end and leading upwardly through slab 13 to a control valve 79 disposed above the slab in position for manual operation, a pipe 81 leading from valve 79 downwardly through slab 13, and a pipe section 83 coupling pipe 81 with the chamber 85 of tank 69. A return conduit means designated in general as at 87 couples tank 69 with cylinder 55. Return conduit means 87 comprises pipe section 73, pipe section 83, and a pipe 89 coupling sections 73 and 83. A check valve 90 is interposed in pipe 89 and permits flow of fluid in the direction indicated by the arrow in Fig. 3—that is, from pipe section 83 towards pipe section 73—but prevents flow of fluid in the opposite direction.

Means is provided for biasing ramp 29, when unloaded, to said upward position. Said biasing means preferably comprises the diamond-like structure indicated in general as at 91 which includes a pair of upper arms 93 respectively pivotally connected adjacent the upper end thereof to ramp 29 at pivot point 95, as by a bracket 97 fixedly mounted on a transverse beam 99 extending between the innermost pair of beams 41, which beam 99 is fixedly mounted thereto by suitable means, as welding or bolts or the like. The other part of biasing means 91 is formed by a pair of lower arms 101 pivotally connected adjacent the lower ends thereof from floor 27 at fixed pivot point 103, as by a bracket 105 anchored to the pit floor. The lower ends of upper arms 93 are respectively pivotally connected to the upper ends of lower arms 101 as at pivot points 107, 109. Biasing means 91 additionally comprises resilient means as two pairs of springs 111. Each pair of springs is attached to a fixed upstanding post 113 at one of their ends and respectively attached at the opposite ends to extensions 115 of lower arms 101. Each extension 115, as viewed from the side as in Fig. 3, extends at an angle relative to the main body of its related arm 101 and forms a rigid extension thereof. Each extension 115 includes a transverse member 117 projecting laterally to either side of the main body of extension 115 to permit room for spring 111 to function. It is to the transverse members 117 that the ends of springs 111 are attached as by means of eye bolts or the like. The height of post 113 is preferably such that each pair of springs 111 angles downwardly from the post to the points of attachment with arms 101. It will be understood that the opposite side corners of biasing means 91 are urged inwardly, i.e., points 107, 109 are urged towards post 113 by springs 111, whereby exerting an upward force on ram 29 at the point of connection with the ramp. The upward force exerted by biasing means 91 is sufficient to urge ramp 29 and plunger 57 to said upward position when the ramp is in an unloaded condition but is not sufficient to support the ramp and plunger when loaded with a truck.

Fig. 3 shows the device of the present invention in condition ready to receive a truck, ramp 29 being in an upward position as heretofore described and valve 79 being closed. In the operation of the device of the present invention, a truck, not shown, backs towards loading platform 11 astraddle curb section 51 with the rear wheels resting on floor plates 43. A tapered guide 119 fixedly mounted on roadway 21 and forming an extension of curb section 51 is preferably provided to aid in backing the truck astraddle curb section 51. It will be understood that, with valve 79 closed, ramp 29 will be supported in said upward position by plunger 57 since plunger 57 is held in the extended position due to fluid F in chamber 75. This is so because the fluid is prevented from flowing from cylinder 55 since it cannot flow past check valve 90 and cannot flow past valve 79.

With the truck loaded on ramp 29 as above described, handle 120 of valve 79 is manually moved from the position shown in solid lines towards the position shown in broken lines to move the valve towards an open position, which permits fluid to flow from cylinder 55 through conduit means 68 and into tank 69, thereby permitting plunger 57 to lower under the weight of the truck on ramp 29. It will be understood that, since the tank is vented, no pressure will be built up therein and the fluid will rise in the tank. Additionally, it will be understood that the amount that valve 79 is opened will determine the rate at which ramp 29 is lowered. Lowering of ramp 29 is continued until the bed of the truck is level with loading platform 11, at which time valve 79 is closed, thereby stopping the flow of fluid from cylinder 55 to cause plunger 57 to hold ramp 29 and the truck thereon at the desired position so that the truck may be loaded or unloaded.

Although an operator is used to position valve 79 during the lowering operation, the device of the present invention is semi-automatic in operation in that when the truck departs from ramp 29 the ramp is automatically returned to its upward position ready for another truck to be received thereon. This is so since, when the weight of the truck is removed from ramp 29, biasing means 91 will urge the ramp to said upward position. This movement will not be resisted by the plunger-cylinder combination 54 since, as plunger 57 is pulled upwardly by ramp 29, fluid is permitted to be drawn freely into cylinder 55 from tank 69 through return conduit means 87.

From the foregoing description, it will be apparent that there are no power requirements in the fluid system of the present invention, which is in contrast to previous types of truck levelers employing fluid under pressure to operate a hydraulic jack or the like that was generally disposed in place of the plunger-cylinder combination 54. In previous types of truck levelers, the truck was backed upon the ramp, which was initially disposed in a horizontal position, and then the ramp either lowered or raised by the hydraulic jack or other power means to position the bed of the truck adjacent the loading dock platform. It will be understood that in these previous types of truck levelers a great deal of power was required since the jack was required to lift the truck, whereas, in the present invention, ramp 29 is initially biased to an upward position and the truck is lowered to the loading dock platform level without any need for power.

A modified form of the present invention is illustrated in Figs. 5 and 6. The details of the structure of the modified form are the same as that heretofore described for the preferred embodiment except for a modification in the biasing means and in the fluid tank. Thus, in this modified form, biasing means 91 is omitted and air pressure is used to bias the platform to the upward position in the following manner: An air line 123 leads from a source of air pressure, not shown, and is coupled to the modified fluid tank 125 and communicates with the chamber 126 adjacent the upper portion thereof so as to provide a pressure against the fluid in the tank. Vent 71 that was used in the preferred embodiment is omitted from tank 125 and the tank is closed from the atmosphere. A constant air pressure is maintained on the top of the fluid in tank 125, which pressure is sufficient to cause plunger 57 to urge ramp 29 to the upward position when the ramp is unloaded but not sufficient to support the ramp when loaded. Since ramp 29 is urged upwardly by plunger 57, there is no need for torque tube 38 to be coupled to plunger 57 and, therefore, in this modified form, inner brackets 65 and pins 61 are preferably omitted.

The operation of the modified form is as follows: With valve 79 closed, the air pressure on top of the fluid in tank 125 causes fluid to flow through return conduit means 87 into cylinder 55 to urge plunger 57 upwardly, carrying with it ramp 29 to the unloaded or upward position heretofore described. When the truck, not shown, backs upon ramp 29, plunger 57 supports the ramp because fluid F is prevented from flowing from cylinder 55 since it cannot flow past check valve 90 and cannot flow past valve 79. With the truck loaded on ramp 29, valve 79 is moved towards the open position, permitting oil to flow into tank 125 through conduit means 68 and, thus, allowing the truck to be lowered. It will be understood that this fluid is permitted to flow into tank 125 since the air pressure is insufficient to prevent this. When the truck has reached the desired height relative to loading platform 11, valve 79 is shut off and plunger 57 holds the truck at this position for loading and unloading. Upon the departure of the truck, the air pressure forces fluid into cylinder 55 to cause the ramp to be returned to the upward position, as heretofore described.

While the invention has been described with reference to certain details of construction as herein shown, it is not confined to the particular arrangement disclosed and this application is intended to cover such modifications or departures as may come within the purposes of the improvements or scope of the following claims.

I claim:

1. In a dock including a roadway for trucks and a platform disposed at a higher level than said roadway, a truck leveler adapted to support a truck adjacent said platform, said truck leveler comprising a ramp having an end away from said platform at substantially roadway level, means pivotally mounting said ramp for pivotal movement up and down about said end between an extreme upward position and a truck cargo loading and unloading position, said ramp initially being in said upward position uncontacted by said truck, auxiliary means for exerting an upward force on said ramp to yieldingly urge said ramp into said upward position for downward pivoting movement to said loading and unloading position by the weight of a truck backed onto said ramp, said upward position being above said loading and unloading position, when in said upward position said ramp being arranged so that the height thereof is such that when said truck is backed thereon the bed of said truck is initially higher than said platform whereby the bed of said truck is adapted to move down toward adjacency to said platform when the ramp moves downward under the weight of said truck to said loading and unloading position, a cylinder mounted below said ramp, a plunger slidably mounted in said cylinder for movement between an extended upward position and a restracted downward position, said ramp resting on said plunger adjacent the upper end thereof whereby downward movement of said ramp by the weight of said truck thereon is effective to urge said plunger towards said downward position; a powerless fluid system including a fluid tank, conduit means coupling said cylinder and said tank for flow of fluid from said cylinder to said tank upon downward movement of said plunger, a valve interposed in said conduit means to control the flow of fluid from said cylinder to said tank whereby providing means for permitting lowering of said ramp with said truck thereon and for stopping said ramp in said loading and unloading position so that the bed of said truck is adjacent said platform for the loading and unloading thereof; said auxiliary means comprising a source of fluid pressure, a line leading from said source of fluid pressure to said tank whereby pressure from said source is exerted on the fluid in said tank, said pressure being sufficient to urge said ramp upwardly to said upward position when in an unloaded condition and being insufficient to urge said ramp upwardly when said truck is positioned thereon; return conduit means coupling said tank and said cylinder to return the fluid to said cylinder from said tank upon departure of said truck, and a check valve interposed in said return conduit means and arranged to permit return flow of fluid to said tank and to prevent flow of fluid through said return conduit means to said tank.

2. In a loading dock including a roadway for trucks and a loading platform disposed at a higher level than said roadway, a truck leveler adapted to support a truck adjacent the platform, said truck leveler comprising a ramp having an end away from said loading platform at substantially roadway level, means pivotally mounting said ramp for pivotal movement about said end between an extreme upward position and a truck cargo loading and unloading position, said ramp initially being in said upward position uncontacted by said truck, said upward position being above said loading and unloading position whereby said ramp is adapted to move from said upward position to said loading and unloading position without power and under the influence of gravity, when in said upward position said ramp being arranged so that the height thereof is such that when said truck is backed thereon the bed of said truck is initially higher than said platform whereby the bed of said truck is adapted to move down towards adjacency to said platform for the loading and unloading thereof when said ramp moves downward under the weight of said truck to said loading and unloading position, a cylinder mounted below said ramp, a plunger slidably mounted in said cylinder for movement between an extended upward position and a retracted downward position, said ramp resting on said plunger adjacent the upper end thereof, a tank, hydraulic fluid contained in said tank, conduit means coupling said cylinder and said tank for flow of fluid from said cylinder to said tank, air pressure means coupled to said tank to exert pressure on said hydraulic fluid and cause said ramp to be urged to said upward position for movement toward said loading and unloading position by the weight of said truck backed onto said ramp, a valve interposed in said conduit means to control the flow of fluid from said cylinder to said tank thereby providing means for lowering said ramp with said truck thereon and for stopping said ramp at said loading and unloading position, return conduit means coupling said tank and said cylinder to return the fluid to said cylinder from said tank upon departure of said truck, a check valve interposed in said conduit means and arranged to permit return flow of fluid to said tank and to prevent flow of fluid through said return conduit means to said tank.

References Cited in the file of this patent
UNITED STATES PATENTS

| | | |
|---|---|---|
| 2,560,064 | Astry | July 10, 1951 |
| 2,703,656 | Banks | Mar. 8, 1955 |
| 2,751,615 | Kelley | June 26, 1956 |
| 2,774,492 | Harrison | Dec. 18, 1956 |
| 2,868,331 | Viilars | Jan. 13, 1959 |